United States Patent
Hedlund et al.

(10) Patent No.: US 9,870,847 B2
(45) Date of Patent: Jan. 16, 2018

(54) HIGH VOLTAGE DEVICE AND A METHOD OF MANUFACTURING A HIGH VOLTAGE DEVICE

(71) Applicant: ABB Technology Ltd, Zurich (CH)

(72) Inventors: Roger Hedlund, Ludvika (SE); Peter Sjöberg, Ludvika (SE); Håkan Faleke, Västerås (SE); Nils Lavesson, Västerås (SE); Harald Martini, Västerås (SE); Joachim Schiessling, Enköping (SE)

(73) Assignee: ABB Schweiz AG, Baden (CH)

( * ) Notice: Subject to any disclaimer, the term of this patent is extended or adjusted under 35 U.S.C. 154(b) by 95 days.

(21) Appl. No.: 14/652,266

(22) PCT Filed: Dec. 5, 2013

(86) PCT No.: PCT/EP2013/075649
§ 371 (c)(1),
(2) Date: Jun. 15, 2015

(87) PCT Pub. No.: WO2014/090677
PCT Pub. Date: Jun. 19, 2014

(65) Prior Publication Data
US 2015/0325341 A1 Nov. 12, 2015

(30) Foreign Application Priority Data

Dec. 13, 2012 (EP) .................................... 12196868

(51) Int. Cl.
*H01G 13/02* (2006.01)
*H01B 17/28* (2006.01)
(Continued)

(52) U.S. Cl.
CPC ............. *H01B 17/28* (2013.01); *H01B 19/04* (2013.01); *H01G 4/32* (2013.01); *H01G 13/02* (2013.01); *H01G 4/18* (2013.01); *Y10T 156/10* (2015.01)

(58) Field of Classification Search
CPC . H01B 17/28; H01B 9/04; H01G 4/32; H01G 13/02
(Continued)

(56) References Cited

U.S. PATENT DOCUMENTS 2,683,792 A * 7/1954 Dubilier ................. H01G 4/015
118/620
3,223,923 A * 12/1965 Howell ................... H01F 38/06
323/355

(Continued)

FOREIGN PATENT DOCUMENTS

CN    2450756 Y    9/2001
CN    1427423 A    7/2003
(Continued)

OTHER PUBLICATIONS

European Search Report Application No. EP 12 19 6868 Completed: Mar. 20, 2013; dated Apr. 2, 2013 5 pages.
(Continued)

*Primary Examiner* — William H Mayo, III
*Assistant Examiner* — Krystal Robinson
(74) *Attorney, Agent, or Firm* — Whitmyer IP Group LLC

(57) ABSTRACT

The method relates to an electric device comprising at least two electrodes which are separated by dielectric part. At least one of said electrodes is arranged to be at a floating potential. The dielectric part comprises at least one turn of at least one non-impregnatable electrically insulating film between two neighboring electrodes. The electrodes are bonded to adjacent turns of non-impregnatable insulating (Continued)

film, and adjacent turns of non-impregnatable insulating film, if any, are bonded to each other, so that the turns of non-impregnatable insulating film and the electrodes form a solid body. The invention further relates to a method of manufacturing an electric device, where bonding of at least one turn is performed upon forming of said turn, so that the bonding of said turn to the turn/electrode underneath will commence before said turn has been completely covered by the next turn.

25 Claims, 4 Drawing Sheets

(51) Int. Cl.
*H01B 19/04* (2006.01)
*H01G 4/32* (2006.01)
*H01G 4/18* (2006.01)

(58) Field of Classification Search
USPC ........................................... 174/31 R
See application file for complete search history.

(56) References Cited

U.S. PATENT DOCUMENTS

| | | | | |
|---|---|---|---|---|
| 6,417,593 | B1* | 7/2002 | Miller | ............... H02K 3/34 310/195 |
| 6,452,109 | B1 | 9/2002 | Koch et al. | |
| 8,274,778 | B2* | 9/2012 | Yoshinaga | ............... H01G 4/32 361/301.5 |
| 9,279,834 | B2* | 3/2016 | Eriksson | ............ G01R 19/0046 |
| 2004/0041678 | A1* | 3/2004 | Young | ............... H01G 4/32 336/200 |
| 2009/0009928 | A1* | 1/2009 | Carlen | ............... H01G 4/012 361/328 |

FOREIGN PATENT DOCUMENTS

| | | |
|---|---|---|
| CN | 1588728 A | 3/2005 |
| CN | 201402952 Y | 2/2010 |
| CN | 101763923 A | 6/2010 |
| CN | 101836269 A | 9/2010 |
| CN | 102013322 A | 4/2011 |
| WO | 2012163561 A1 | 12/2012 |

OTHER PUBLICATIONS

International Search Report and Written Opinion of the International Searching Authority Application No. PCT/EP2013/075649 Completed: Dec. 20, 2013; dated Jan. 10, 2014 7 pages.

First Chinese Office Action Application No. CN201380072932.0 Issue Date: Mar. 7, 2016 4 pages.

Chinese Search Report Application No. 201380072932.0 Completed: Feb. 25, 2016 3 pages.

* cited by examiner

HIGH VOLTAGE DEVICE AND A METHOD OF MANUFACTURING A HIGH VOLTAGE DEVICE

TECHNICAL FIELD

The present invention relates to the field of high voltage technology, and in particular to high voltage devices which have at least two electrodes separated by a dielectric spacing material.

BACKGROUND

High voltage bushings are used for carrying current at high potential through a plane, often referred to as a grounded plane, where the plane is at a different potential than the current path. Bushings are designed to electrically insulate a high voltage conductor, located inside the bushing, from the grounded plane. The grounded plane can for example be a transformer tank or a wall.

In order to obtain a smoothening of the electrical potential distribution between the conductor and the grounded plane, a bushing often comprises a condenser core. A condenser core is a body which typically comprises a number of floating, coaxial electrodes made of a conducting material, where the electrodes are separated by a dielectric spacing material. The dielectric spacing material is often oil impregnated or resin impregnated paper.

SUMMARY

The present invention relates to an electrical device arranged to provide electrical insulation of a conductor which extends through the device. The electric device can for example be a bushing or a cable termination. The electric device comprises at least two electrodes which are separated by a dielectric part. At least one of the electrodes is arranged to be at a floating potential so as to control the electric field around the conductor. The dielectric part comprises at least one turn of at least one non-impregnatable electrically insulating film between two neighbouring electrodes. The electrodes are bonded to adjacent turns of non-impregnatable insulating film, and turns of non-impregnatable insulating film which are adjacent to each other, if any, are bonded to each other, so that the turns of non-impregnatable insulating film and the electrodes form a solid body.

The invention also relates to a method of manufacturing an electric device comprising at least two electrodes which are separated by a dielectric part. The method comprises: forming the dielectric part from at least one turn of at least one non-impregnatable, electrically insulating film; and bonding any adjacent turns of non-impregnatable insulating film to each other, as well as bonding electrodes to adjacent turns of non-impregnatable insulating film, so that a solid body is formed. In the manufacturing method, no turn located between two electrodes is formed from an impregnatable film, and the bonding of at least one of said turns is performed upon forming of said turn, so that the bonding of said turn to the turn/electrode underneath will commence before said turn will be covered by the next turn.

In the method, the bonding can for example be performed by use of surface plasma activation, or by use of a substance which is in a viscous phase during the bonding, i.e. in a liquid or semi-liquid phase. These methods are examples of methods which facilitate for the bonding of a turn to commence before the turn is covered by the next turn. Other methods which facilitate such bonding may also be used. By initiating the bonding of a turn before the turn is covered by the next turn, the amount of voids in the electrical device, and thereby the risk of partial discharge and/or treeing, can be greatly reduced.

In some implementations of the method, the bonding of a turn is in fact completed before the next turn is added. In other implementations, the bonding of a turn continues after the turn has been covered by the next turn. However, at least part of the process of bonding a turn, to the turn or electrode located underneath said turn, is performed before said turn is covered by the next turn.

In one embodiment, the dielectric part does not include any impregnated turn between two neighbouring electrodes. In another embodiment, an already impregnated, and thereby non-impregnatable, film is used in the manufacturing process to form a turn between two neighbouring electrodes. In this embodiment, the dielectric part will include an impregnated film.

Since the electric device does not need to be impregnated, cured or post-heated, the manufacturing time and costs can be greatly reduced. Furthermore, the possibility of eliminating the impregnation step from the manufacturing process yields an environmental benefit, since the use of epoxy or oil is eliminated from the manufacturing process.

The non-impregnatable electrically insulating film could for example comprise a thermoplastic material, a glass material and/or a ceramic material. Many thermoplastic materials, glass materials and ceramic materials exhibit higher dielectric strength than oil- or resin impregnated paper. This is especially true when the material thickness is low, such as in the dielectric part between two electrodes. Hence, at a given rated voltage of the device, the use of such materials allows for a smaller device diameter.

Non-impregnatable films can typically be made considerably thinner than a layer of oil- or resin impregnated paper, and electrodes can hence be placed at a smaller distance from each other. With a smaller distance between the electrodes, the dielectric strength of the material increases, the dielectric strength being a measure of the highest electric field which can be maintained in the material before an electric breakdown occurs. This also allows for a reduced diameter of the electric device as the distance between electrodes is reduced.

A suitable distance between neighbouring electrodes typically lies within the range of 4-5000 µm. Oftentimes, the electrode distance will lie within the range of 50-1000 µm, for example within the range of 50-300 µm or 100-250 µm.

Typically, the average number of turns of non-impregnatable insulating film between two neighbouring electrodes lies within the range of 1-100, although an even higher number of turns may be used. Oftentimes, the average number of turns between two neighbouring electrodes will lie within the range of 1-50, and for example within the range of 1-20.

Also, the precision in the thickness of the non-impregnatable insulating films is typically considerably higher than the precision in the thickness of conventionally used impregnated paper. Such improved precision in the film thickness results in an improved precision in the distance between electrodes. Furthermore, since the bonding commences already during the forming a turn, an electrode will be fixed at its position already during the winding process. This is particularly beneficial in manufacturing methods wherein separate electrodes are introduced during the winding. Both the fixed positions of the electrodes, and an improved precision in the distance between electrodes, are factors which will improve the predictability of the field grading properties of the device. An improved predictability of the field grading properties of the set of electrodes also allows for reduction of the device diameter.

A reduced diameter provides the advantages of less material being used during production of the device, as well as less weight and less space occupancy, both at transportation and during installation. Furthermore, a reduced diameter typically results in enhanced transportation of heat from the centre of the electrical device, thus reducing the risk of thermal damage of the electric device.

In one embodiment, at least one non-impregnatable film from which the dielectric part is formed comprises at least two layers, wherein a first layer is of a first material and a second layer is of a second material, the first and second materials exhibiting different properties. Hereby is achieved that the dielectric part can benefit from advantageous properties of different materials. For example, the temperature dependencies of the mechanical properties of the first and second materials can be such that there exists at temperature range wherein a first material provides better adhesive properties than the other material(s) of the film, while a second material provides better mechanical stability than the other materials.

A boundary between adjacent turns of non-impregnatable insulating film and/or a boundary between a turn of non-impregnatable insulating film and an adjacent electrode may comprise an adhesive substance of a composition different to the composition of the turns of non-impregnatable insulating film. Hence, upon manufacturing of such electrical device, an adhesive substance was introduced between turns/electrodes. Alternatively, the bonding was formed so that no external adhesive substance was necessary, for example by heating a material forming part of the non-impregnatable insulating film, or by surface plasma activation.

The electrodes can be formed from a conductive material which has been printed or painted onto at least one of the at least one non-impregnatable insulating films. Printed or painted electrodes can be very thin, so that a fine grading of the electric field with high precision in field distribution can be achieved. Electrodes can also be formed from foils of conductive material which have been inserted between turns of non-impregnatable film. The thickness of the electrodes could for example fall within the range of 10 nm-300 µm.

In one embodiment of the manufacturing method, at least two films, located side by side in the axial direction of the device, are used to form a turn which has an axial length that is larger than the width of a single one of the at least two films. Hereby, an electric device of any axial length can be obtained. When an adhesive substance in the viscous phase is used in the manufacturing process, the gap between two such films will be filled with the adhesive substance, and voids can thereby be avoided. An electrical device, which is manufactured from at least two films located side-by-side, will thus typically have a joint along the circumference of at least one turn.

The electric device is oftentimes arranged so that at least two of said electrodes have a different length in the axial direction of the electric device, and so that at least one end edge of at least one electrode is not covered by any outer electrode. In some electric devices according to this aspect of the invention, none of the end electrode edges are covered by an outer electrode, whereas in other electric devices according to this aspect, some (at least one) of the electrodes have at least one end edge (and typically two end edges when the device is a bushing) which is not covered by an outer electrode, while other electrodes have end edges which are covered by outer electrodes. Here, an outer electrode is said to cover a end edge of an inner electrode if the outer electrode extends to, or beyond, the axial position of the end edge. The term end edge is here used to refer to an edge which defines a plane that is more or less perpendicular to the conductor, as opposed to an axial edge, which is parallel to the conductor.

By arranging the electrodes so that at least one end edge of an electrode is not covered by any outer electrodes, the electric field around the conductor will be efficiently graded. In this configuration, the electric field, at the end edges which are not covered by any outer electrodes, will have significant components in both the radial and axial directions. The axial electric field components can give rise to undesired treeing and/or partial discharge, unless the interior of the electric device is basically free from voids. By means of the manufacturing method described above, electric devices can be obtained wherein the extension of any voids is less than 10 µm, or smaller. Hereby, electric devices which can operate in the high voltage range can be achieved, for example in the range of 36 kV-1100 kV, or higher.

Further aspects of the invention are set out in the following detailed description and in the accompanying claims.

DETAILED DESCRIPTION

Figure 1:
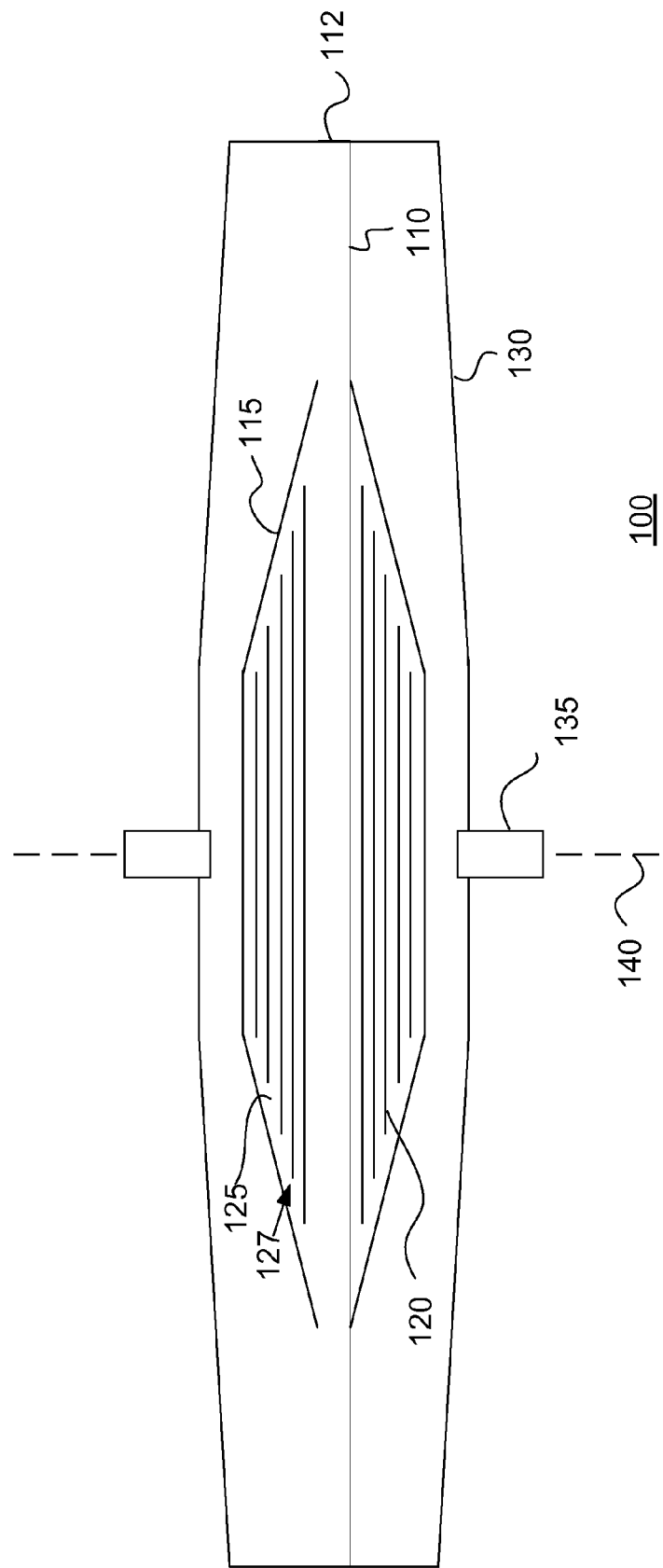
FIG. 1 is a schematic cross sectional view of example of a bushing having a condenser core.

FIG. 1 schematically illustrates an embodiment of a bushing 100 wherein a conductor 110 extends through a condenser core 115. The conductor 110 could form part of the bushing 100, or could be separate to the bushing 100. FIG. 1 is a cross sectional view along the axis of the bushing 100. At both ends, the conductor 110 is provided with a terminal 112 for connecting the bushing 100 to electrical devices such as cables, transformers etc. The condenser core 115 operates as a voltage divider and distributes the field along the length of the bushing 100, thereby providing a smoothening of the electrical potential distribution.

The condenser core 115 comprises at least two (and often a plurality of at least three, or more) electrodes 120 which are separated by a dielectric part 125 of a dielectric spacing material. The dielectric part 125 serves to separate the electrodes 120 from each other. The electrodes 120 are typically coaxially arranged, where the radius of an inner electrode is smaller than the radius of an outer electrode. In order to obtain an efficient grading of the electric field, the axial length of an outer electrode 120 is often smaller than the axial length of an inner electrode 120, so that a similar area of the different electrodes 120 is achieved. Hence, the end edges 127 of the electrodes 120 typically form steps, so that the end edges 127 of an electrode 120 are not covered by any outer electrode 120, as shown in FIG. 1. The term end edge 127 is here used to refer to an edge which typically forms a more or less circular (spiral) shape, and which defines a plane which is more or less perpendicular to the conductor 110, as opposed to an axial edge, which is substantially parallel to the conductor 110.

If desired, a condenser core 115 could additionally or alternatively have at least some electrodes 120 arranged so that an inner electrode 120 extends a shorter distance in the axial direction than an outer electrode 120 at at least one of the condenser core 115 ends, so that steps are formed by the electrode edges 127 in a manner opposite to that shown in FIG. 1, in a direction from a condenser core end towards the centre of the condenser core 115.

In such arrangements, where the end edges 127 of the electrodes 120 form steps at a condenser core end, the local electric field at the end edges 127 of the electrodes 120 will be considerably higher than the electric field in the interior of the bushing 100, and will have significant components in both the radial and the axial direction. However, a varying axial length of the electrodes 120 further results in an axial distance between end edges 127, the axial field at the end edges 127, as well as between the end edges 127, thereby being reduced.

Two electrodes 120, between which there is no further electrode 120, so that the two electrodes 120 are separated by the dielectric part 125 only, will here be referred to as neighbouring electrodes 120.

The bushing 100 of FIG. 1 further includes an elongate insulator 130 surrounding the condenser core 115, as well as a flange 135, which can be used for electrically connecting the busing 100 to the grounded plane 140, typically via the outermost electrode 120 of the condenser core 115, or via some of the outer electrodes 120 of the condenser core 115. It should be noted that the grounded plane 140 does not have to be connected to ground, but may have a potential which differs from ground. However, the grounded plane 140 will have a potential which differs from the potential of the conductor 110, when in use, and the term grounded plane will hereinafter be used for ease of description.

Typically, the outermost electrode 120 is connected to a flange 135, or other part, which is at the potential of the grounded plane 140. In some bushings 100, the innermost electrode 120 is arranged to be at the potential of the conductor 110, whereas in other bushings 100, the innermost electrode 120 is arranged to be at a floating potential. An electrode 120 located between the innermost and outermost electrodes 120 is typically arranged to be at a floating potential, although a bushing may have one (or more) electrode 120 which is located between the innermost and outermost electrodes, and which is arranged to be at a fixed potential, the fixed potential differing from the potential of the conductor 110 and the potential of the grounded plane 140.

A main reason for providing electrodes 120 in a bushing 100 is to geometrically shape the electric field around the conductor 110 around the location of the grounded plane 140, so as to avoid flashover between the conductor 110 and the grounded plane 140. In the interior of the bushing, the electric field between two neighbouring electrodes 120 will mainly be in the radial direction of the bushing 100. At the end edges 127 of the electrodes 120, however, the electric field will have significant components in both the axial and radial directions. The axial field gives rise to special requirements in terms of avoiding voids which extend in the axial direction of the bushing: The amount of voids, e.g. gaps/bubbles of air, other gases, or vacuum, needs to be kept to a minimum in a high voltage bushing. In the presence of voids which extend in the axial direction, the axial field can cause charges to move between the electrodes 120, and the risk of treeing will increase. Treeing might cause adverse changes in the electric field, and can ultimately cause electric breakdown. Furthermore, the presence of voids can cause partial discharge, which would, apart from causing aging of the dielectric material, also give rise to electric signals. In case the bushing is connected to equipment which needs to be monitored, e.g. a transformer, such electric signals can disturb the monitoring measurements. Hence, there is a desire to minimise the presence of voids in a bushing 100.

A condenser core 115 is conventionally wound from sheets of dielectric material, such as paper or non-woven plastic, which will form the dielectric part 125. The electrodes 120 are conventionally entered into the winding at suitable positions during the winding process. After winding, the dielectric material is conventionally impregnated with an electrically insulating impregnant such as oil or thermoset polymer (e.g. resin). By use of an impregnant, a dielectric part 125 can be obtained which has basically no voids in terms of gaps/bubbles of air, other gases, or vacuum.

The post-winding processing in the manufacturing of a condenser core 115 having impregnated paper as a dielectric spacing material is very time consuming and therefore costly. The paper is typically first wound around the conductor. The paper is then dried, impregnated and cured (in the thermoset polymer case) or dried and impregnated (in the oil case). This post-winding processing of the condenser core in the form of drying/-impregnation/curing often takes around a week, or more. Hence, there is a strong desire to find improved manufacturing methods which are less time consuming, but which nevertheless provide bushings having adequate electrical and mechanical properties.

According to the invention, an electric device comprising at least two electrodes 120 which are separated by a dielectric part 125 can be obtained by forming the dielectric part from at least one turn of at least one non-impregnatable, electrically insulating film. Any adjacent turns of non-impregnatable insulating film are bonded to each other, and electrodes 120 are bonded to adjacent turns of non-impregnatable insulating film, so that a solid body is formed. In a method of manufacturing an electrical device, turns of non-impregnatable insulating film are bonded to adjacent turns of non-impregnatable insulating film, if any, while electrodes 120 are bonded to adjacent turns of non-impregnatable insulating film. No turn which is located between two electrodes is formed from an impregnatable film. Furthermore, in the method of manufacturing, the bonding of a turn of non-impregnatable insulating film is performed upon forming of the turn, so that the bonding of a particular turn, to the turn/electrode located underneath, will commence before the particular turn has been completely covered by the next turn.

Here, a film is referred to as being non-impregnatable if it cannot be impregnated by an electrically insulating impregnation fluid, such as oil, resin, ester oil or an electrically insulating gas. An impregnatable film, on the other hand, has a structure such that openings exist on one side of the film, such openings being connected to openings on the other side of the film via connections/voids, here referred to as channels, in which impregnation fluid may be transported from one side of the film to the other. When an impregnatable film has been impregnated, such channels will be filled with impregnation fluid (cured or not). Hence, a film is here referred to as being impregnated if it has channels filled with an electrically insulating impregnant such as oil, a cured resin, an ester oil or an electrically insulating gas. Consequently, a turn is referred to as being impregnated if there are channels filled with an electrically insulating impregnant which lead through the turn (often in a meandering manner). A non-impregnatable film, on the other hand, does not have such channels. If a non-impregnatable film were to be exposed to an impregnation process, there would be no channels in the film structure through which the impregnant could be transported. In some circumstances, diffusion may act to facilitate for an impregnant to enter also a non-impregnatable film. In some cases, a non-impregnatable film may contain for example 5 weight % of an electrically insulating impregnant. However, diffusion is a much slower process than an impregnation process and does not result in channels which are filled with the impregnant, and thereby not in an impregnated film.

Oftentimes, the dielectric part 125 is formed from more than one turn, so that a multi-turn dielectric part is formed.

By forming the dielectric part from turns of at least one non-impregnatable insulating film which are bonded into a solid body, no impregnant will be required and the post-winding processing of the condenser core 115 can be significantly reduced or eliminated. Typically, no material which has been impregnated with an electrically insulating fluid will be present in the condenser core 115 (although in some circumstances, a pre-impregnated film can be used, which is non-impregnatable at the time of winding of the dielectric part 125, thus resulting in a condenser core 115 in which turns of impregnated film are present). By bonding together adjacent turns of non-impregnatable insulating film, and bonding electrodes 120 to adjacent turns of non-impregnatable film during the forming of the turns, the dielectric part 125 can be made essentially free from voids in terms of gaps/bubbles of air, other fluids, or vacuum. Partial discharge can thus be avoided without any impregnation of the condenser core 115. At the same time, the condenser core 115 will obtain suitable mechanical properties in terms of force-absorption and prevention of fluids from migrating through the bushing 100. The solid condenser core 115, obtained by bonding the electrodes and turns of non-impregnatable insulating film into a solid body, can serve as a plug which seals the flange 135 and stops any oil or gas from passing between the two sides of the grounded plane 140. This property is typically useful for bushings 100 which are used for connecting oil or gas filled electrical equipment, such as an oil filled transformer.

Examples of suitable non-impregnatable insulating materials include thermoplastic materials, glasses and ceramics. Examples of suitable thermoplastics include polypropylene (PP), polyethylene terephthalate (PET), polyethylene naphthalate (PEN), polyphenylene sulfide (PPS), polyether sulphone (PES), polytetrafluoroethylene (PTFE), polyamide (PA), polycarbonate (PC), etc.

Thermoplastics, glasses and ceramics are typically less harmful to the environment than the thermosetting polymers or oils commonly used as impregnants of impregnatable dielectric materials such as paper or non-woven plastic. However, films of thermosetting plastics could also be used to form non-impregnatable insulating turns in a dielectric part 125, if desired.

The method of forming the condenser core 115 from turns of non-impregnatable insulating films which are bonded and, together with the electrodes 120, form a solid body, facilitates for the use of insulating materials which have better electric and/or mechanical properties than the commonly used impregnated paper. For example, many thermoplastics and glasses/ceramics exhibit a significantly higher dielectric strength than epoxy- or oil impregnated paper under the circumstances in a bushing 100, wherein the material thickness (determined by the distance between neighbouring electrodes 120) is comparatively low. Hence, by use of a thermoplastic, a glass or a ceramic, a condenser core 110 of a smaller diameter can typically be used for a given voltage, than if impregnated paper were used in the dielectric part 125. Thus, the space occupied by the bushing, as well as transportation costs to the installation site, can be reduced. Furthermore, many insulating materials, which are suitable for use in a non-impregnatable insulating film, exhibit similar thermal conductivity than the traditional insulating materials, such as oil- or resin impregnated paper. Thus, a bushing of smaller diameter would also result in the advantage of lower temperatures within the bushing 100.

Figure 2:
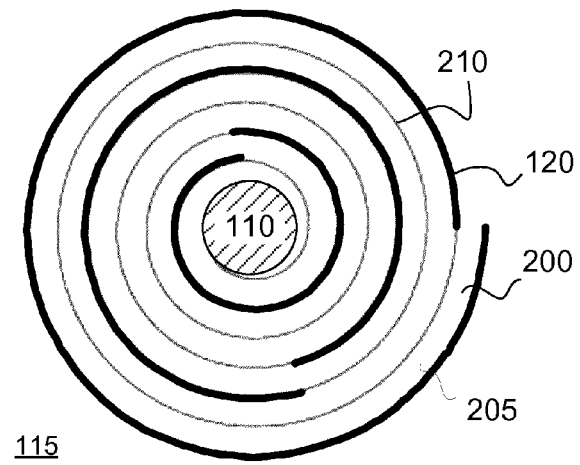
FIG. 2 is a schematic cross sectional view of an example of a condenser core according to an embodiment of the invention.

FIG. 1 illustrates a cross sectional view along the axial direction of a bushing according to an embodiment of the invention. FIG. 2 schematically illustrates a cross section of an example of a condenser core 115 according to an embodiment of the invention, where the cross section is taken perpendicularly to the axis of the condenser core 115. The dielectric part 125 of FIG. 2 is formed from bonded turns 200 of a non-impregnatable insulating film 205. In the schematic drawing of FIG. 2, the condenser core 115 comprises three electrodes 120. The number of electrodes 120 could take any number greater than one. In many implementations, the condenser core 115 comprises a higher number of electrodes 120, for example two, three, five, ten, twenty, a hundred or more. The boundary between different turns 200 of the insulating film 205 is indicated by reference numeral 210. There will be at least one turn 200 of the non-impregnatable insulating film between two electrodes 120. In the example illustrated in FIG. 2, the number of turns 200 between two electrodes 120 is 2-3. The average number of turns 200 between two neighbouring electrodes 120 could for example lie within the range of 1-100. However, in some circumstances, a higher number of turns 200 can be used between neighbouring electrodes 120, for example in the order of hundreds or thousands of turns 200. By using a lower number of turns 200, the number of interfaces within the dielectric part 125 can be kept low. On the other hand, if the non-impregnatable insulating film has some defects, it can be advantageous to use at least two turns between neighbouring electrodes 120, since the risk of a defect occurring in two turns at the same position of the bushing is small. The number of turns 200 between two neighbouring electrodes will often fall within the range of 1-50, for example within the range of 1-20 turns.

The electrode arrangement shown in FIG. 2 is an example only. For example, in FIG. 2, all electrodes 120 are electrically separated, and the two axial edges of each electrode 120 exhibit a small overlap. Other electrode arrangements may be used. Two or more neighbouring electrodes 120 could for example be short circuited; each electrode 120 could be arranged so that there is no, or a larger, overlap, etc.

Turns 200 of non-impregnatable, insulating film 205 can for example be added by means of winding and/or by means of extrusion. When turns 200 of a film 205 are added by means of extrusion, the film 205 is formed during the extrusion process, and the bonding of the most recently added turn 200 of the film 205 can take place at the same time as the addition of the turn 200, since the extruded material will typically be in an adhesive state upon extrusion. When turns 200 of film 205 are added by means of winding a film 205 which is in the solid state, the bonding can advantageously also be performed during the winding process. The bonding can for example be achieved by use of an external adhesive substance (external bonding); by means of heating so that at least a part of the film 205 enters an adhesive state and the film 205 itself provides the adhesive substance (internal bonding), or by means of surface plasma activation (internal bonding). The terms internal and external refer, respectively, to whether the adhesive substance is internal or external to the film(s) 205 used to form the dielectric part 125.

In a surface plasma activated bonding process, both surfaces of a film 205 is typically treated with a plasma, so as to activate the chemical bonds at the surface in order to facilitate for bonding with adjacent turns 200 or with an adjacent electrode 120.

In an internal bonding process wherein a film 205 itself enters an adhesive state, the adhesive state of the film in an internal bonding process could for example be a liquid state, so that the material which provides the bonding is melted upon bonding; or a semi-liquid state, which can occur for example in amorphous thermoplastics, depending which material(s) are present in the film 205.

Hence, in both the extrusion process, and in the process wherein a solid film is wound into the insulating part 125, the bonding of a turn 200 can for example be achieved by use of a substance which is in a viscous phase during at least part of the forming of the turn 200, where the viscous phase of a substance is here defined as a phase wherein the viscosity of the substance falls within the range of $10^{-3}$ to $10^8$ Pa·s. By using an adhesive substance which is in a viscous phase at least during part of the time when a turn 205 is formed, and by commencing the bonding of the turn 200 before it has been covered by the next turn 200 or electrode 120, the amount of voids in the condenser core 115, and hence the risk for partial discharge, can be greatly reduced. This can also be achieved by other methods of initiating bonding during the winding process, for example by surface plasma activation.

An external adhesive substance could for example be such that it cures into a solid state by means of heat, time, pressure, cooling and/or the addition of a component (two-component adhesive), or in any other suitable way. Such adhesive substance could for example have good electrically insulating properties. Examples of suitable substances which can serve as an external adhesive substance include epoxy, polyurethane, methaacrylate, polyvinyl butyral (PVB) and silane-terminated polymers.

Figure 3A:
FIG. 3a illustrates a film of a single layer of a non-impregnatable insulating material.
Figure 3B:
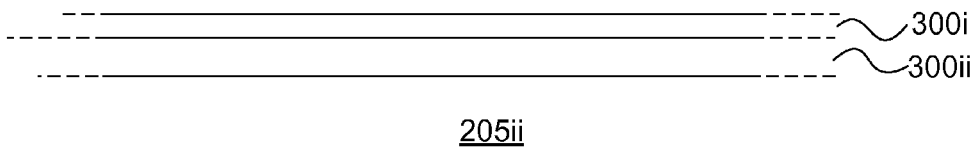
FIG. 3b illustrates a double layer film of two different non-impregnatable insulating materials.
Figure 3C:
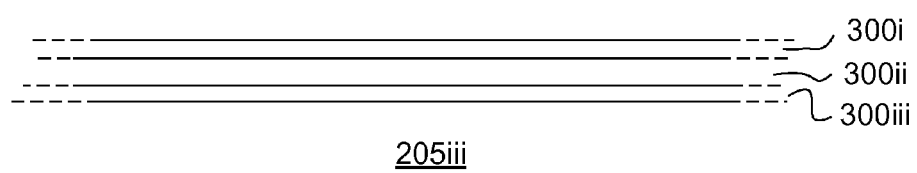
FIG. 3c illustrates a triple layer film of at least two different non-impregnatable insulating materials.

A non-impregnatable and electrically insulating film 205 could be a single layer film having a single layer 300, a double layer film having two layers 300 of different materials, or a film 205 of three or more layers 300 of at least two different materials. Examples of a single layer film 205i, a double layer film 205ii and a triple layer film 205iii are shown in FIGS. 3a-3c, respectively. When more than one layer 300 is used in a film 205, the materials of the different layers 300 could be selected to have different properties, so that the film 205 will benefit from properties of different materials. In FIGS. 3a-3c, examples of different designs of non-impregnatable insulating films 205 are shown, the three examples here referred to by use of reference numerals 205i, 205ii and 205iii, respectively. When jointly referring to these film designs, or to non-impregnatable insulating films 205 in general, the reference numeral 205 is used. Similarly, different layers 300 of the same film 205 are indicated in FIGS. 3a-3c by reference numerals 300i, 300ii and 300iii. When referring to a film layer in general, the reference numeral 300 will be used. A film 205 comprising more than one layer 300 will be referred to as a layered film 205.

Examples of properties which could vary between the layers 300 of a film 205 include adhesive properties, electrical insulation, mechanical stability, heat resistance, cost etc.

In one embodiment of the invention, the materials in a layered film 205 are selected so that the temperature dependency of the mechanical properties of the materials is such that there exists a temperature range within which the difference in the mechanical properties of the different layers 300 is more pronounced. Upon bonding of the different turns 200, the film 205 could for example be heated to reach a temperature within such temperature range. In a first implementation of this embodiment, a first material provides better adhesion within a temperature range than the other material(s). In this implementation, such first material could advantageously be facing at least one of the surfaces of the film 205. The first material could then contribute to the bonding between turns of film 205 and/or between electrodes 120 and adjacent turns of film 205, if the film 205 is heated to a temperature within this range. In another implementation, the materials are selected so that a first material provides better mechanical stability than the other material(s) in a temperature range. In yet another implementation, a first material provides the best adhesive properties, while a second material provides the best mechanical stability in a temperature range to which the film 205 is heated during the bonding process. In one example, a first material is in an adhesive state, while a second material is in a solid, non-adhesive state within this temperature range. The second material would then ensure mechanical stability of the film 205 during the bonding process, while the first material would contribute to the bonding.

Material combinations could for example include a combination of different thermoplastic materials; a thermoplastic material and a glass material; a thermoplastic material and a ceramic material, etc. Examples of suitable material combinations include polyethylene & polyether sulfone (PES), where polyethylene can provide adhesion and is typically of lower cost, while the PES material provides mechanical stability; or polypropylene & polyphenylene sulfide (PPS), where the polypropylene is of lower cost and the PPS is more resistant to heat, so that the PPS provides better mechanical stability during operation of the bushing in environments of higher temperatures; or a glass and polyvinyl butyral (PVB). These combinations are given as examples only, and there are many further suitable material combinations.

Some materials, such as glass and some thermoplastics, occur in a glass state rather than an ordered solid state. The term solid state is here used to refer to both the ordered solid state and the glass state of materials.

Different ways of manufacturing a condenser core 115 having electrodes 120 which are separated by (and bonded to) turns 200 of non-impregnatable insulating film will now be discussed in relation to FIGS. 4 and 5. In the embodiment illustrated by FIG. 4, a non-impregnatable insulating film 205 is wound around the conductor 110 (or, if no conductor 110 is present in the condenser core 115, around the space where a conductor is to be inserted) to form turns 200. The point where the flat part of the film 205 touches the condenser core 115 will here be referred to as the tangential point 405, and the turn 200 that has just been wound onto the condenser core 115 will be referred to as the outermost turn 410. A force 403 could be applied to a part of the film 205 which has not yet formed a turn 200, in the plane of the film 205 in the direction away from the condenser core 115, so as to stretch the film 205. In this way, voids in terms of pockets of air or other gases, or even vacuum, can be avoided in the condenser core 115.

As mentioned above, bonds between adjacent turns 200, as well as between an electrode 120 and its adjacent turn(s), could for example be formed by use of an external adhesive substance; by heating the film 205 in the vicinity of the tangential point 405 in order to make at least part of the film 205 enter an adhesive state; or by surface plasma activation. In FIG. 4, a hot roller 415 is illustrated as a heat source. A heat source could be used to make at least part of the film 205 enter an adhesive state, or to cure a heat-curing external adhesive substance, if used. The heat from the heat source could advantageously be applied in the vicinity of the tangential point 405, although heat could also or alternatively be applied at other positions of a turn 200. Other possible heat sources include e.g. sources of infrared (IR) light and sources of hot air. In some implementations of the manufacturing method, no heat source is required.

A pressure could be applied to the outermost turn 410 in the vicinity of the tangential point. In FIG. 4, the application of a pressure is illustrated by means of a hot roller onto which a force 417 is applied. To apply a pressure to the outermost turn 410 in the vicinity of the tangential point 405 could be beneficial in order to reduce the risk of voids forming in the condenser core 115, and/or to cure a pressure-curing external adhesive substance, if used. Other possible sources of pressure include e.g. a cold roller, a pressurized fluid, or a pressure-inducing conveyor belt. In some implementations of the manufacturing method, no source of pressure is required.

To apply heat and/or pressure in the vicinity of the tangential point 405 should here be construed as applying heat and/or pressure to a part of the outermost turn 410 which has recently been wound onto the condenser core 115, e.g. in a region along the arc defined by the tangential point 405 and the angle $\alpha$ in the direction of rotation of the condenser core 115, where a could for example take a value between 0 and 90 degrees, such as for example in the range of 0-25 degrees. Alternatively, the pressure/heat could be applied in a region for which the angle $\alpha$ takes a larger value.

If desired, a heat sink 420 could be applied to the outermost turn 410, at a position beyond the area in which heat, if any, is applied to the surface of the condenser core 115, in order to cool the outermost turn 410. A heat sink 420 could for example be applied in a region along an arc defined by the angle $\alpha$ taking a value in the range between 180 and 360 degrees. In one embodiment, a heat sink 420 is located so as to remove heat from a region defined by the value of a being in the range of 180 to 270 degrees. In another embodiment, heat is removed from the entire part of the arc to which the heat of a heat source 415, if present, is not applied. A heat sink 420 could for example be implemented by means of one or more cold rollers as shown in FIG. 4; by means of a source of air of a temperature which is lower than the outermost turn 410, or in any other suitable way. As an alternative to a heat sink 420, the ambient temperature during the bonding processing could be low enough for the film heated by the heat source 415 to return to a suitable temperature before being covered by the next turn of film. In other implementations, the next turn 200 could be applied while the previous turn is approximately at the temperature obtained by means of a heat source 415.

Figure 4:
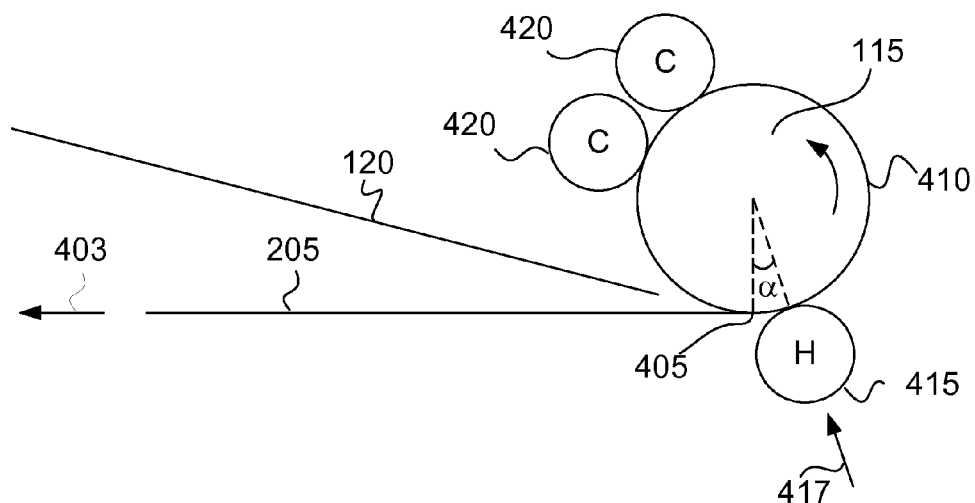
FIG. 4 schematically illustrates an embodiment of a device for manufacturing a condenser core comprising turns of non-impregnatable insulating film.

In another implementation of the method of FIG. 4, more than one film 205 could simultaneously be wound around the conductor 110. The different films 205 would then be bonded to each other upon winding, while the inner of the films 205 would be bonded to the already wound part of the condenser core 115 (formed by the outer film). This method could for example be useful when it is desired to have two or more different materials in the condenser core 115, as an alternative to, or in addition to, using a film 205 having more than one layer 300. The materials in the different films 205 could for example be such that one (or more) film 205 is in an adhesive state at the temperature achieved by means of the hot roller 415 (or other heat source), while the other film(s) 205 are in a solid state at this temperature. Another reason for simultaneously winding more than one film 205 around the conductor 110 could be to increase the speed of winding. In this case, the different films 205 could be of the same material, if desired.

Upon forming turns 200 by winding one or more films 205 around the central part of the condenser core 115, the condenser core 115 is typically rotated around its axis.

Figure 5B:
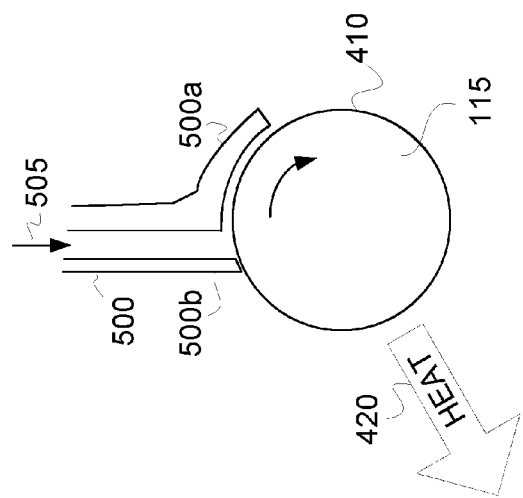
FIG. 5b schematically illustrates an embodiment of a device for manufacturing a condenser core comprising turns of non-impregnatable insulating film.
Figure 5C:
FIG. 5c schematically illustrates an example of an orifice of an extrusion nozzle which could be used in the device shown in FIG. 5a or 5b.
Figure 5A:
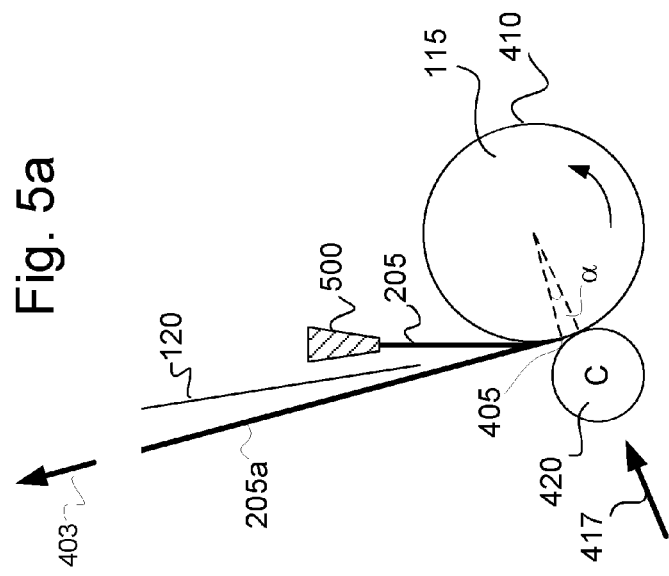
FIG. 5a schematically illustrates an embodiment of a device for manufacturing a condenser core comprising turns of non-impregnatable insulating film.

FIG. 5a schematically illustrates an apparatus for an embodiment of a manufacturing method, wherein a non-impregnatable insulating film 205 is created during the winding process by means of extrusion. An extrusion nozzle 500 is arranged so that the extruded material forms a "curtain" which will land on the condenser core 115 to form turns 200 as the condenser core 115 is rotated, this extrusion method referred to as curtain extrusion. The extrusion nozzle 500 is often arranged above the condenser core 115, so that gravity will assist in the application of the extruded material onto the condenser core 115. The extruded material could typically be a thermoplastic material, although other extrudable, non-impregnatable insulating materials could be used. The extrusion nozzle 500 could for example be connected to an extrusion apparatus as known in the art (not shown) in which non-impregnatable insulating material in the solid state (for example in the form of beads or pellets) is melted and pushed through the extrusion nozzle 500. In the implementation of the apparatus shown in FIG. 5a, a heat sink 420 in the form of a cold roller is applied in the vicinity of the tangential point 405 in order to cool down the extruded material and to apply pressure (cf. force arrow 417) so that the risk of voids will be reduced. Other means of heat sinks and/or pressure providers could be used. In some implementations, a heat sink or pressure provider might not be necessary.

In the implementation of the apparatus shown in FIG. 5a, the extruded film 205 is combined with a wound, solid state film 205a, which is wound onto the condenser core 115 at the same time as the extruded film 205 is formed. The wound solid state film 205a contributes to the mechanical stability of the turns 200, and could be of the same or different material as the extruded film 205.

In another implementation, the entire dielectric part 125 could be made from turns of extruded film 205. Such condenser core 115 could for example be manufactured by means of an extrusion nozzle 500, the orifice of which is placed at a close distance to the outermost turn 410 of the condenser core, and which comprises a tail part and a head part between which the extruded material exits the extrusion nozzle 500. An example of a manufacturing device comprising such extrusion nozzle 500 is shown in FIG. 5*b*. The tail part 500*a* follows behind the head part 500*b* as the extrusion nozzle 500 performs a relative movement in relation to the surface of the condenser core 115 (the relative movement typically caused by the rotation of the condenser core 115). Extruded material flows between the head and tail parts, in the direction of the arrow 505. The tail part 500*a* thus passes across a newly applied turn nearly 360 degrees before the head part 500*b* passes across the newly applied turn. The distance d between the surface of the condenser core 115 and the tail part 500*a* determines the thickness of the extruded turn 200. The head part 500*b* could be arranged to be closer to the surface of the condenser core 115 than the tail part 500*a* in order to direct the melted thermoplastic in the direction of the tail part 500*a*, as well as to scrape off any excess material from the surface of the condenser core 115. A heat sink 420 could also be applied (cf. FIGS. 4 and 5*a*), for example in the form of a cold roller or a source of cold air. In order to further shape an extruded layer of thermoplastic material and to reduce the risk of air bubbles forming in the condenser core 115, a roller could be applied to a part of the outermost layer 410 which has recently been wound onto the condenser core 115 (cf. reference numeral 415 of FIG. 4 or reference numeral 420 of FIG. 5*a*). Other designs of the extrusion nozzle 500 than what has been shown in FIGS. 5*a* and 5*b* could alternatively be used.

The orifice of an extrusion nozzle 500 can for example be in the shape of an elongate rectangle as shown in FIG. 5*c*, so that the extruded shape will be of thickness t and length l, where l corresponds to the desired axial length of the condenser core 115.

In all embodiments of the manufacturing method, electrodes 120 will be introduced between turns 200 of film 205 at suitable positions during the process of forming the turns 200 (if the condenser core 115 only includes two electrodes 120, one will typically be introduced between two turns 200 and the other will typically be introduced on top of the (last) outermost turn 410). The electrodes 120 could for example be made of foils of aluminium, copper or any other conducting material, which are inserted at suitable positions during the formation of the turns 200. This way of introducing the electrodes 120 between turns 200 is illustrated in FIGS. 4 and 5*a*. Alternatively, the electrodes 120 could be formed from a metallized insulating layer, where the metallization is achieved for example by printing or painting metallic material onto an insulating film. Electrodes 120 made of conducting, non-metallic materials such as carbon black or graphite could also be used. Electrodes 120, metallic or not, could for example be printed or painted directly onto a non-impregnatable insulating film 205 forming the turns 200 of the dielectric part 125, or on a separate sheet of insulating material which is inserted between turns 200. When printed or painted directly onto a film 205 forming the turns 200, the printing/painting could be made prior to forming the turns, or on the most recently added (outermost) turn 410 during the formation of the dielectric part 125. Electronic printing is well known in the art and described for example in Chapter 1.3 of "Bit Bang—Rays to the Future", edited by Yrjo Neuvo & Sami Ylönen, Helsinki University Print, 2009. Printing techniques include for example screen printing, flexography, gravure, offset lithography and inkjet printing. Roll-to-roll processing could also be used. Other possible techniques for depositing the electrodes onto an insulating film include Physical Vapour Deposition techniques, for example sputtering, and Chemical Vapour Deposition techniques.

In a bushing wherein the electrodes 120 are formed by separate foils of conducting material, the bonding of the electrode 120 during the winding or extrusion process will ensure that the foils stay in place and will not be displaced in the axial direction, which can occur in bushings 100 of other designs. By ensuring that the electrodes 120 are in a fixed position, the precision of the field grading achieved by the electrodes 120 will be improved, and thereby, a smaller distance between the electrodes 120 can be used. This benefit is also achieved when the electrodes 120 are arranged onto a non-impregnatable insulating film 205, for example in printed form, since the bonding of a turn 200, onto which an electrode is arranged, commences during the forming of the turn.

Since the electrodes 120 can be applied onto a film 205 in the solid state, or even onto the solid body formed by the presently added turns 200, electrodes of very low thickness can be used. A fine grading of the electric field with high precision in field distribution can thus be achieved. The thickness of the electrodes 120 could for example in the range of 1-10 μm, or be as small as 10 nm, or smaller. Thicker electrodes could also be used. The thickness of the electrodes 120 typically falls within the range of 10 nm-300 μm.

In the embodiment wherein an external adhesive substance is used to form bonding between turns 200 of non-impregnatable insulating film and between electrodes 120 and their adjacent turns 200, the same adhesive substance as is used between two turns 200 could be used to form bonding between a non-impregnatable insulating turn and an electrode 120, or, if desired, a different adhesive could be used to form these bonds. In the embodiments wherein internal bonding is used and the insulating film 205 itself is heated into a melted or semi-melted state to provide the bonding, the electrodes 120 could be bonded to the adjacent turns 200 of insulating film 205 in the same way, i.e. by melting or semi-melting at least part of the adjacent turns 200 of insulating film 205. Alternatively or additionally, an external adhesive substance could be applied to form the bonding between an electrode 120 and its adjacent turns 200 of non-impregnatable insulating film 205.

The manufacturing of a condenser core 115 having a dielectric part 125 formed from bonded turns 200 of non-impregnatable, electrically insulating film(s) 205 will be considerably less time consuming than the manufacturing of condenser cores 115 having a dielectric part formed from impregnated material, such as paper, or from layers of impregnated plastic nonwoven as described in U.S. Pat. No. 6,452,109. The main reason for this reduction in production time is that post-winding steps, such as impregnation, curing, or post-heating, can be eliminated.

The use of non-impregnatable insulating films which are bonded together leads to a possibility of improved precision in the distance between two neighbouring electrodes 120 in a condenser core 115, since many non-impregnatable materials can be made into thinner films 205 than paper can. Paper typically has a thickness of around 100 μm or more. Moreover, the paper used in resin impregnated condenser cores 115 has to be crepped in order to allow the resin, which is of high viscosity, to flow into the inner parts of the condenser core 115. The crepping prohibits a high precision in the thickness of a turn of paper, and typically increases the average thickness of the paper to around 300 µm. Hence, the distance between neighbouring electrodes 120 will be at least 300 µm when impregnated paper is used as the insulation material.

Many non-impregnatable films 205, such as thermoplastic films, can be made as thin as 4 µm or less, and the distance between neighbouring electrodes 120 can hence be controlled with much better precision than when using impregnated paper, for example in steps of 4 µm. Hence, the distance between electrodes can be smaller in a bushing comprising turns of non-impregnatable insulating film instead of impregnated paper. Hereby, a bushing 100 of smaller diameter can be used at a particular voltage, or a bushing of a particular diameter can be used for higher voltages, since the field grading can be more efficient if the distance between electrodes can be better controlled. Furthermore, the dielectric field strength of a material increases when the thickness of the material decreases. As thin films will allow for a smaller distance between neighbouring electrodes, the dielectric field strength of the dielectric part can be increased, and the diameter of the bushing can thereby be reduced. A reduced diameter means that space savings can be made, both during transport and at the installation site.

Typically, the thickness of the non-impregnatable film lies within the range 4-600 µm, for example in the range of 4-500 µm.

A manufacturing process of adding turns 200 of electrically insulating film 205 of non-impregnatable insulating material onto each other, while bonding the most recently added turn to the solid body formed by the previously added and bonded turns/electrodes, can be seen as a lamination process, where the most recently added turn is laminated onto the solid body formed by the previously bonded turns and electrodes. Thus, the condenser core 115 formed by such process can be seen as a laminated condenser core 125.

By means of the method of bonding together turns of insulating film 205 and electrodes 120, large solid condenser cores 115, having a dielectric part 125 of a material of high insulation properties such as thermoplastics, can be produced. Thus, condenser cores 115 of a thermoplastic dielectric part 125 can be designed for high voltage applications.

Figure 6:
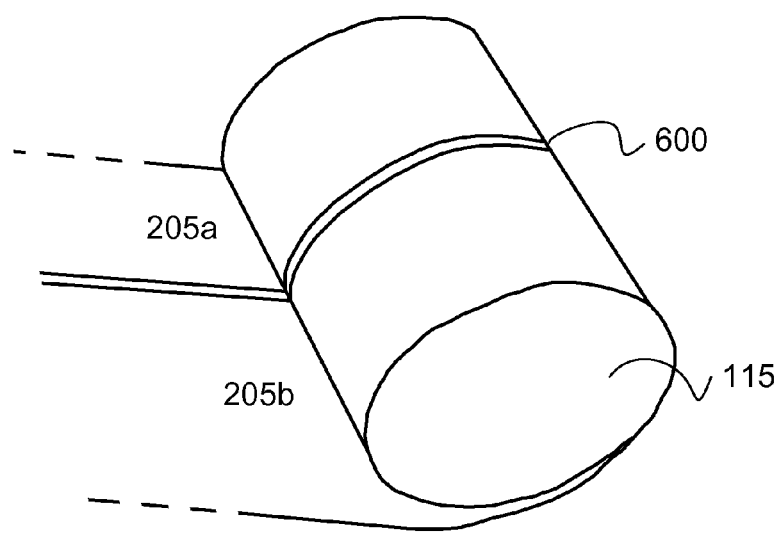
FIG. 6 schematically illustrates an example of a dielectric part of a condenser core being manufactured from two separate non-impregnatable insulating films according to an embodiment of the manufacturing process.

In fact, the manufacturing method described above is suitable for manufacturing of condenser cores 115 of any length: If it is desired to obtain a condenser core 115 of an axial length, which exceeds the width of a film 205, two or more films 205 can be applied side by side. This applies to the manufacturing method using extrusion, as well as to the method wherein solid films 205 are used to form the turns 200. When two or more films 205 are placed side by side, part of a turn 200 is formed by a first film 205a, and another part of a turn 205 is formed by a second film 205b, and so forth. FIG. 6 schematically illustrates an example of a condenser core 115, of which the dielectric part 125 is formed from two separate solid films 205a and 205b, which are placed side-by-side.

When the bonding of adjacent turns 200 (and/or bonding of electrodes 120 to adjacent turns 200) is performed upon forming of a turn 200, by use of an internal or external adhesive substance in a viscous phase, the adhesive substance will fill up any gap between the first 205a and second films 205b, so that a full turn 200 will be formed. Hence, the non-impregnatable, insulating turns 200 of a condenser core 115, which have been formed from two or more films 205 having been arranged side-by side, will have a joint 600 along the circumference of the turn 200. The adhesive substance can be an external or internal adhesive substance.

If desired, an additional amount of adhesive substance can be applied at the joint, to ensure that the joint is adequately filled. In one implementation of the manufacturing method, an external adhesive substance can be applied to the turn 200 by means of curtain coating, where the adhesive substance is applied along the length of the condenser core 115 as a "curtain". The application of an external adhesive substance by means of curtain coating could be used also on manufacturing embodiments where the length of the condenser core is formed from a single film width, if desired.

In order to improve the dielectric strength of the dielectric part 125, the position of the joint can vary during the forming of the turns 205, so that the distance between the joint and an end of the condenser core 115 will vary between and within different turns 205.

In a condenser core 115, which has been formed from two or more separate non-impregnatable films 205 placed side-by-side, at least some of the electrodes 120 can also be divided into two or more parts along the length of the condenser core, so that an electrode 120 at a particular radial distance from the conductor 110 comprises at least a first part at the first end of the condenser core 115, and a second part at a second end of the condenser core 115, where the first and second parts are not electrically connected. If desired, electrodes 120 can be divided into such parts also in condenser cores 115 which are formed from a single film 205.

Since the length of the electrodes 120 decreases as the radial distance from the conductor 110 increases, the outermost turn(s) 200 can oftentimes be formed from a single film 205, if desired, even in a condenser core 115 of large length.

As mentioned above, the axial length of the electrodes 120 is typically smaller for outer electrodes 120 than for electrodes closer to the conductor 110. The solid body formed from the bonded turns of non-impregnatable film and the electrodes 120 could, if desired, have conical or tapered ends. Conical or tapered ends are often used in order to reduce the weight of the conductor core 115, and/or to save on non-impregnatable film material. When winding the conductor core 115 from one or more already existing films, as discussed in relation to FIG. 4, the width of the film could e.g. be cut prior to winding the film onto the condenser core 115, so as to decrease the width of the film prior to winding as the radius of the condenser core 115 increases. Alternatively, instead of the solid body having conical or tapered ends, the solid body could have the shape of a cylinder, or have ends of another shape, such as spherical ends.

The above described bushings, wherein the condenser core 115 is formed from turns of non-impregnatable, insulating films 205 and electrodes 120 which are bonded together to form a solid body, can be applied in both AC and DC applications. The bushings are particularly suitable for high voltage applications, for example in the voltage range of 36-1100 kV, or higher, but could also be used at lower voltages.

By use of the manufacturing method described above, electric devices can be produced, wherein any voids in the dielectric part 125, or between the dielectric part 125 and the electrodes 120, are negligibly small. For example, electric devices which basically contain no voids of an extension larger than 15 µm can be obtained. Electric devices wherein the voids, if any, have an even smaller extension, such as 10 µm or 5 µm, or smaller, can also be achieved.

When the dielectric part 125 of a condenser core 115 is formed by bonding turns 200 of non-impregnatable insulating film 205 and electrodes 120 to form a solid body, there will be no need for an impregnation medium, and no need for a housing surrounding the condenser core 115. If desired, a housing could still be used to protect the condenser core 115 from dirt and wear, and/or to provide an increased creepage distance, etc. However, a housing is not necessarily required, since the condenser core 115 is solid.

Although described in relation to bushings 100, the technique of bonding turns 200 of non-impregnatable, electrically insulating films 205 and electrodes 120 to form a solid body can also be used for other electrical devices wherein at least two electrodes are separated by a dielectric part 125. Examples of such other equipment include capacitors, measurement transformers (also referred to as instrument transformers) and cable terminations. Cable terminations are typically used to provide electrical insulation of a conductor at a transition from a cable to equipment such as a transmission line, transformer bushing, busbar, etc. One type of cable termination comprises a condenser core 115 having at least one electrode 120 at a floating potential. What has been said about the design of the bushing 100 in the above, can also be applied to the design of this type of cable termination.

The manufacturing methods discussed above have been described in terms of turns 200 of at least one non-impregnatable, insulating film 205 being arranged around a rotating conductor 110. This corresponds to rotating an inner part of the condenser core 115 around its axis of rotation. In the case of for example a capacitor, there is no conductor 110 present, but the inner part of the capacitor will be rotated when arranging the film 205 into turns 200. In the case of a capacitor, the inner part could, if desired, be of a non-cylindrical shape. The resulting capacitor could take a more elongate shape—for example an elliptical shape, or a parallelepiped shape, a triangular shape etc. Furthermore, in some cases, a condenser core 115 which does not include a conductor 110 may be desired, so as to allow a user of a bushing 100 to fit his own conductor 110 into the condenser core 115. When manufacturing an electrical device which does not include a conductor 110, an axial edge of the first turn 200 can be temporarily fixed to an axis of rotation, this axial edge of the first turn corresponding to the inner part of the device.

Although various aspects of the invention are set out in the accompanying claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. An electric device arranged to provide electrical insulation of a conductor extending through the device, the electric device comprising:
   at least two electrodes which are separated by a dielectric part;
   at least one of said at least two electrodes being arranged to be at a floating potential so as to control an electric field around the conductor;
   the dielectric part comprising at least one turn of at least one non-impregnatable electrically insulating film between two neighbouring electrodes of said at least two electrodes;
   wherein each electrode is bonded to each of the at least one turns of non-impregnatable electrically insulating film that is adjacent thereto, and turns of non-impregnatable electrically insulating film which are adjacent to each other, if any, are bonded to each other, so that the dielectric part and the electrodes form a solid body.

2. The electric device of claim 1, wherein
at least two neighbouring electrodes of said at least two electrodes are separated by at least two turns of non-impregnatable electrically insulating film.

3. The electric device of claim 2, wherein
a space between two neighbouring electrodes of said at least two neighboring electrodes does not comprise any impregnated turn.

4. The electric device of claim 1, wherein
at least one of said at least one non-impregnatable electrically insulating film from which the dielectric part is formed comprises at least one layer of a thermoplastic material.

5. The electric device of claim 1, wherein
at least one of said at least one non-impregnatable electrically insulating film from which the dielectric part is formed comprises at least one layer of a glass material.

6. The electric device of claim 1, wherein
a distance between neighbouring electrodes lies within a range of 4-5000 μm.

7. The electric device of claim 1, wherein
an average number of turns between two neighbouring electrodes in the dielectric part lies within a range of 1-100.

8. The electric device of claim 1, wherein
the dielectric part has no voids larger than 10 μm.

9. The electric device of claim 1, wherein
at least one of said at least one non-impregnatable electrically insulating film from which the dielectric part is formed comprises at least two layers, wherein a first layer is of a first material and a second layer is of a second material, the first and second materials exhibiting different properties.

10. The electric device of claim 1, wherein
a boundary between adjacent turns of non-impregnatable electrically insulating film and/or a boundary between a turn of non-impregnatable electrically insulating film and an adjacent electrode comprises an adhesive substance of a composition different to a composition of the turns of non-impregnatable electrically insulating film.

11. The electric device of claim 1, wherein
at least one of said at least one turn of non-impregnatable electrically insulating film has a joint along a circumference of the turn.

12. The electric device of claim 1, wherein
the bonding of said at least one turn of non-impregnatable electrically insulating film to an adjacent turn or adjacent electrode underneath it, is provided before said at least one turn is covered by and bonded to a next turn or electrode.

13. The electric device of claim 1, wherein
the at least two electrodes are formed from a conductive material which has been printed or painted on at least one of the at least one non-impregnatable insulating films.

14. The electric device of claim 1, wherein
the at least two electrodes are formed from foils of a conductive material which have been inserted between said at least one turn of non-impregnatable electrically insulating film.

15. The electric device of claim 1, wherein
at least two of said at least two electrodes have a different length in an axial direction of the electric device, and the at least two electrodes are arranged so that at least one end edge of at least one of said at least two electrodes is not covered by any outer electrode.

16. The electric device of claim 1, wherein
the electric device is a bushing or a cable termination.

17. A method of manufacturing an electric device comprising at least two electrodes which are separated by a dielectric part, the method comprising:
forming the dielectric part from at least one turn of at least one non-impregnatable, electrically insulating film; and
bonding any adjacent turns of non-impregnatable insulating film to each other, as well as bonding electrodes to adjacent turns of non-impregnatable insulating film, so that a solid body is formed, wherein
no turn located between two electrodes is formed from an impregnatable material; and
the bonding of at least one of said turns is performed upon forming of said turn, so that the bonding of said turn, to the turn/electrode underneath, will commence before said turn has been completely covered by the next turn.

18. The method of claim 17, wherein
the bonding is performed by use of a substance which is in a liquid or semi-liquid phase during at least part of the step of bonding.

19. The method of claim 17, wherein
a pressure is applied, during the forming of said dielectric part, to the already formed turns, at least along a line from one end of the electric device to the other.

20. The method of any one of claim 17, wherein
the bonding comprises heating a thermoplastic material, which forms part of a non-impregnatable insulating film, beyond a temperature above which the thermoplastic material has adhesive properties.

21. The method of any one of claim 17, wherein
the bonding comprises the use of an external adhesive substance between turns of non-impregnatable insulating films and/or between a turn of non-impregnatable insulating film and an electrode.

22. The method of any one of the claim 17, further comprising cooling at least part of the presently outermost turn before covering the presently outermost turn with the next turn.

23. The method of any one of claim 17, wherein
the forming comprises adding turns by winding at least one non-impregnatable insulating film at least one turn around an inner part of the electric device.

24. The method of any one of claim 17, wherein
the forming comprises adding turns by rotating an inner part of the electric device around an axis, in the vicinity of an extrusion nozzle, while non-impregnatable, electrically insulating material is extruded from the extrusion nozzle, so that turns of non-impregnatable, electrically insulating film are formed and bonded during the extrusion process.

25. The method of any one of claim 17, wherein
at least two films, located side by side in the axial direction of the device, are used to form a turn which has an axial length that is larger than the width of a single one of the at least two films.

* * * * *

UNITED STATES PATENT AND TRADEMARK OFFICE
CERTIFICATE OF CORRECTION

PATENT NO. : 9,870,847 B2
APPLICATION NO. : 14/652266
DATED : January 16, 2018
INVENTOR(S) : Roger Hedlund et al.

Page 1 of 1

It is certified that error appears in the above-identified patent and that said Letters Patent is hereby corrected as shown below:

On the Title Page

Column 1, (71) Applicant:
"ABB Technology Ltd, Zurich (CH)"

Should read:
--ABB Schweiz AG, Baden (CH)--

Signed and Sealed this
Tenth Day of April, 2018

Andrei Iancu
*Director of the United States Patent and Trademark Office*